UNITED STATES PATENT OFFICE.

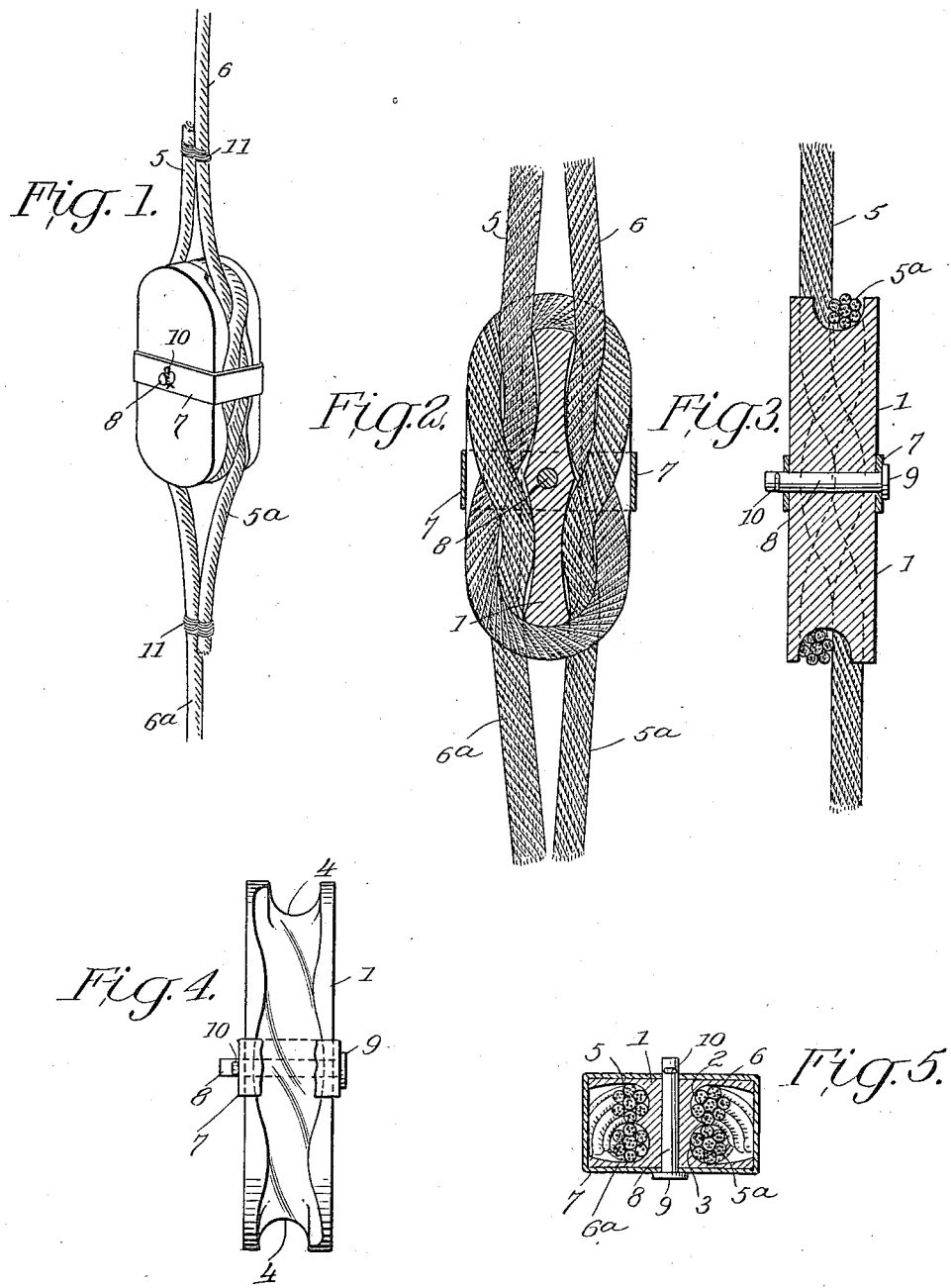

JOHN J. GILMARTIN, OF GUILD, TENNESSEE.

CLUTCH.

1,081,735.      Specification of Letters Patent.      Patented Dec. 16, 1913.

Application filed July 11, 1913. Serial No. 778,453.

*To all whom it may concern:*

Be it known that I, JOHN J. GILMARTIN, a citizen of the United States, and a resident of Guild, in the county of Marion and State of Tennessee, have made certain new and useful Improvements in Clutches, of which the following is a specification.

My invention is an improvement in clutches, and has for its object to provide a clutch, especially adapted for splicing flexible members of metal, as for instance cables, ropes, and the like, wherein mechanism is provided for rigidly holding the ends of the cable together in the form of a square or reefing knot.

In the drawings: Figure 1 is a perspective view of the improved clutch in place, Fig. 2 is a transverse vertical section, Fig. 3 is a section at right angles to Fig. 2, Fig. 4 is an edge view of the clutch with parts broken away, and, Fig. 5 is a section taken on the line 5—5 of Fig. 1.

The present embodiment of the invention comprises a block 1 of suitable material, and of elliptical contour longitudinally, the said block being rectangular in cross section, and provided with a plurality of annular grooves. The said grooves 2 and 3 are distinct at the sides of the block and intermediate the ends thereof, while at the ends the said grooves merge into each other, as indicated at 4 in Fig. 5. The grooves extend entirely around the circumference of the block, and they are shaped to fit the ends of the cable, when the said ends are connected in the form of a square or reefing knot.

The above-mentioned knot is formed in the following manner: The extremity 5 of one of the sections 6 of the cable to be spliced is doubled back upon the body of the section, as shown in Figs. 1 and 2, to form a loop, and the extremity 5ª of the other section 6ª is passed through the said loop from below upward, and from rearwardly toward the observer.

The extremity 5ª is then passed behind the side members of the loop of the section 6, to the front of the said loop, and is then passed through the loop from the front rearwardly, and brought alongside the body 6ª of the section. With cables or ropes of fabric material, the knots so formed will hold when the said knot is pulled tight, and the greater the traction on the cable the more tightly the knot will hold. With cables of metal, however, the knot will not hold, on account of the lack of sufficient flexibility to permit the constituent elements of the knot to be pulled into firm and tight contact with each other. The side walls of the grooves 2, 3 and 4 of the block are so shaped, however, that when the ends of the cable are connected in the manner specified above, the double loop will fit within the said grooves 2, 3 and 4, as shown in Fig. 2. A substantially rectangular frame 7 of metal is provided for encircling the block and the doubled loops formed, and a pin 8 is passed through a transverse opening in the block, and through registering openings in the side members of the frame, to hold the frame in place on the block. The pin is provided at one end with a head 9, and at the other with an opening for receiving a cotter pin 10 or the like, to prevent displacement of the pin. That portion of the block inclosed by the bottom of the groove is shaped, as shown in Fig. 2, to fit within the doubled loop of the knot, so that when strain comes upon the remote ends of the sections 6 and 6ª, those portions of the knot which are adjacent to the said portion of the block will be firmly clamped between the outer portions of the knot, and the said portion of the block, as will be evident from an inspection of Fig. 2. That is, the side members of each loop will be compressed between the said portion of the block and the body of the other loop, so that there can be no slipping of the loops with respect to each other. The extremities 5 and 5ª of the sections of the cable are connected to the bodies of the sections, by means of bindings 11 of cord or wire, as shown in Fig. 1. It is obvious that the bindings 11 might be replaced by metal clips or clamps of any desired construction.

As is known, steel cables are guaranteed to sustain a certain weight, and it is extremely difficult to connect the ends of a broken cable in such manner that the full lifting capacity of the cable is retained. With the improved block, however, there is no weakening of the cable at the knot.

I claim:

1. The combination with cable sections, of a clutch for connecting the said sections, each section of the cable having its end doubled back upon the body of the cable to form a loop, the outer end of each section of the cable and the inner end thereof being passed through the loop of the other cable section, and a block of elliptical shape having a groove extending around its peripheral surface and shaped to fit within the double loop, a substantially rectangular frame engaging the block at the center thereof, the ends of the frame passing transversely of the sides of the loops, and a pin passing through the block and the frame to hold the frame in place, the extremity of each cable section being secured to the body of the section.

2. The combination with cable sections, of a clutch for connecting the said sections, each section of the cable having its end doubled back upon the body of the cable to form a loop, the outer end of each section of the cable and the inner end thereof being passed through the loop of the other cable section, and a block of elliptical shape having a groove extending around its peripheral surface and shaped to fit within the double loop, and a substantially rectangular frame engaging the block at the center thereof, the ends of the frame passing transversely of the sides of the loops.

JOHN J. GILMARTIN.

Witnesses:
WALTER L. McGILL,
GEO. W. NAILL.

Copies of this patent may be obtained for five cents each, by addressing the "Commissioner of Patents, Washington, D. C."